United States Patent [19]

Callerio et al.

[11] Patent Number: 4,950,131

[45] Date of Patent: Aug. 21, 1990

[54] HIGH-EFFICIENCY TURBINE, IN PARTICULAR FOR EXPLOITING WIND POWER IN AUXILIARY POWER SOURCES FOR AERONAUTICAL APPLICATIONS

[75] Inventors: Antonio Callerio; Vincenzo Callerio, both of Milan, Italy

[73] Assignee: F.I.M.A.C. Fabbrica Italiana Macchine Aria Compressa S.p.A., Senago, Italy

[21] Appl. No.: 362,740

[22] Filed: Jun. 7, 1989

[30] Foreign Application Priority Data

Jun. 15, 1988 [IT] Italy ................. 20974 A/88

[51] Int. Cl.$^5$ ................. F01D 25/16; F03D 11/00
[52] U.S. Cl. ................. 416/87; 416/139; 416/143
[58] Field of Search ............ 416/87, 142 B, 44 A, 416/51 A, 139 A, 137, 143, 88, 89

[56] References Cited

U.S. PATENT DOCUMENTS

| 2,492,653 | 12/1949 | Reek ................. 416/89 |
| 2,533,785 | 12/1950 | Fumagalli ................. 416/142 B |
| 2,815,188 | 12/1957 | Nelson ................. 416/44 A |
| 2,955,656 | 10/1960 | Balje et al. ................. 416/142 X |
| 2,986,218 | 5/1961 | Wagner et al. ................. 416/143 X |
| 2,986,219 | 5/1961 | Boardman et al. ................. 416/88 X |

FOREIGN PATENT DOCUMENTS

| 3130257 | 2/1983 | Fed. Rep. of Germany ... 416/139 A |
| 1013456 | 7/1952 | France ................. 416/137 |
| 1032358 | 7/1953 | France ................. 416/137 |
| 461247 | 4/1975 | U.S.S.R. ................. 416/143 |
| 500363 | 5/1976 | U.S.S.R. ................. 416/87 |
| 612062 | 6/1978 | U.S.S.R. ................. 416/139 A |

Primary Examiner—Edward K. Look
Assistant Examiner—Hoang Nguyen
Attorney, Agent, or Firm—Guido Modiano; Albert Josif

[57] ABSTRACT

This high-efficiency turbine, in particular for the exploitation of wind power for auxiliary power sources in aeronautical applications, comprises a central body which is rotatable about the axis of the turbine and supports at least two vanes which extend radially with respect to the axis of the turbine and are rotatable together with the central body about the turbine axis. The vanes of the turbine are pivoted to the central body to vary the front area of the turbine affected by the rotation of the vanes.

12 Claims, 2 Drawing Sheets

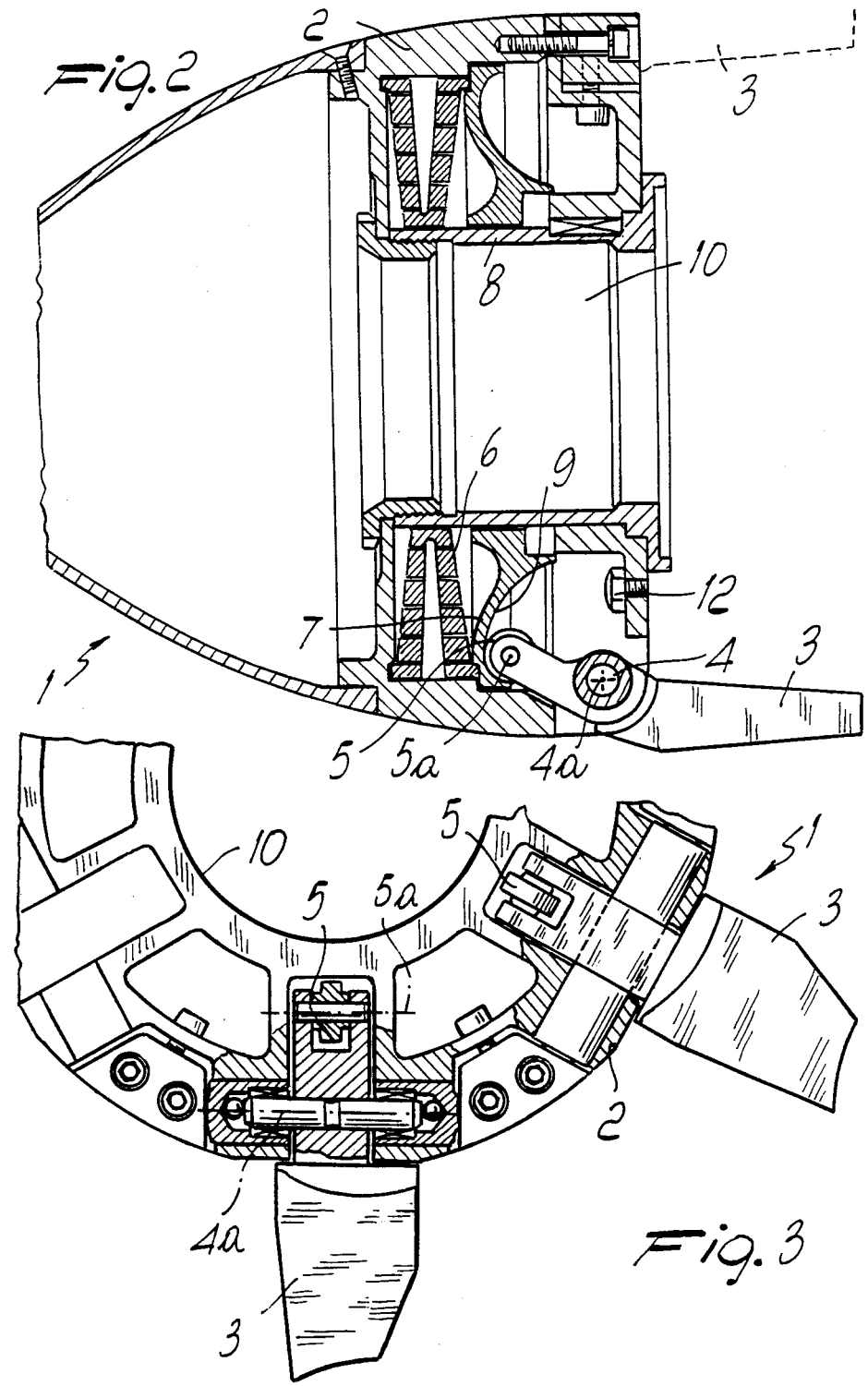

HIGH-EFFICIENCY TURBINE, IN PARTICULAR FOR EXPLOITING WIND POWER IN AUXILIARY POWER SOURCES FOR AERONAUTICAL APPLICATIONS

BACKGROUND OF THE INVENTION

The present invention relates to a high-efficiency turbine, particularly for exploiting wind power in auxiliary power sources for aeronautical applications.

Wind-driven turbines are known which are installed on aircraft and are intended to supply power to the onboard systems in emergency conditions or for special applications, by using the kinetic energy of the surrounding air as it flows relative to the aircraft.

Such turbines, known as "Ram Air Turbines", generally have a small number of radial vanes (usually two or four) and are connected to the shaft of an alternator and/or to the shaft of a pump to generate electric and/or hydraulic power.

In view of the extensive aerodynamic range within which these turbines are used, from the minimum speeds of the aircraft up to the sonic range at altitudes comprised between 0 and 15,000 meters, and in view of the relative uniformity required for the speed of the alternator, said turbines have a device for controlling their rotation rate. Said device is generally composed of an element responsive to the rotation rate (constituted for example by a hydraulic pump or by a Watt pendulum with centrifugal masses), an element for varying the rigging angle of incidence of the vanes (that is the angle formed by the vanes with a plane perpendicular to the turbine axis), for example a hydraulic cylinder, and a feedback element which completes the adjustment circuit.

Said adjustment devices are structurally complicated and are often scarcely reliable; if hydraulic components are used, their operation is furthermore not constant as the environmental parameters vary, such as for example when the temperature varies.

Turbines are also known in which the rotation rate adjustment device does not use hydraulic components but exclusively mechanical components. More particularly, these turbines generally have four vanes, of which two are keyed on the central body of the turbine with a fixed incidence angle while the other two have a variable incidence angle. Eccentric masses are used to adjust the rotation rate of the turbine; said masses act directly on the movable vanes, in contrast with elastic means, varying their incidence angle, while the feedback element is constituted by mechanical components (generally a connecting rod-crank assembly) which are precisely connected to the other elements which compose the adjustment device. In practice the adjustment device only controls two vanes, which are oriented about their radial axis, while the other pair of vanes, which is arranged at a right angle, remains fixed in a position optimized for minimum operating speeds; at higher speeds the adjustment is therefore provided by balancing between the excess motive torque provided by the fixed vanes and the resistive torque provided by the two movable vanes, which progressively reduce their supporting contribution as the speed rises until they act as aerodynamic brakes.

Though this known kind of turbine is structurally simpler, more reliable and insensitive to temperature variations with respect to the previously described turbines, they have some disadvantages.

Said turbines in fact have an acceptable efficiency with low relative speeds of the motive fluid, but at high speeds their efficiency is considerably penalized. Though such a condition is acceptable when using the turbine as an emergency generator, which in any case uses a non-relevant part of the overall available energy, it entails excessively low energy efficiencies within the scope of its systematic use as decentralized generator.

Known turbines furthermore have a relatively high aerodynamic resistance which affects fuel consumptions at high speeds and requires the use of adequately sized fixing structures which affect the overall weight of the aircraft. Said turbines furthermore produce aerodynamic disturbances for the aircraft, again due to their relatively high aerodynamic resistance.

SUMMARY OF THE INVENTION

The aim of the present invention is to solve the above described problems by providing a turbine which has a reduced aerodynamic resistance with respect to known turbines even at high aircraft flight speeds, so as to reduce the aircraft's overall fuel consumption.

Within this aim, an object of the invention is to provide a turbine which has an acceptable energy efficiency in a vast range of aircraft speeds, so that it can be adopted as decentralized power generator.

Another object of the invention is to provide a turbine which requires reduced fixing structures.

Not least object of the invention is to provide a turbine which is structurally simple, highly reliable and insensitive to temperature variations.

This aim, these objects and others which will become apparent hereinafter are achieved by a high-efficiency turbine, as defined in appended claim 1.

BRIEF DESCRIPTION OF THE DRAWINGS

The characteristics and advantages of the invention will become apparent from the description of a preferred but not exclusive embodiment of the turbine according to the invention, illustrated only by way of non-limitative example in the accompanying drawings, wherein:

FIG. 2 is a sectional view of the turbine, similar to FIG. 1, taken in another operating condition; and FIG. 3 is a partially sectional rear elevation view of the turbine according to the invention.

DESCRIPTION OF THE PREFERRED EMBODIMENTS

Figure 1:
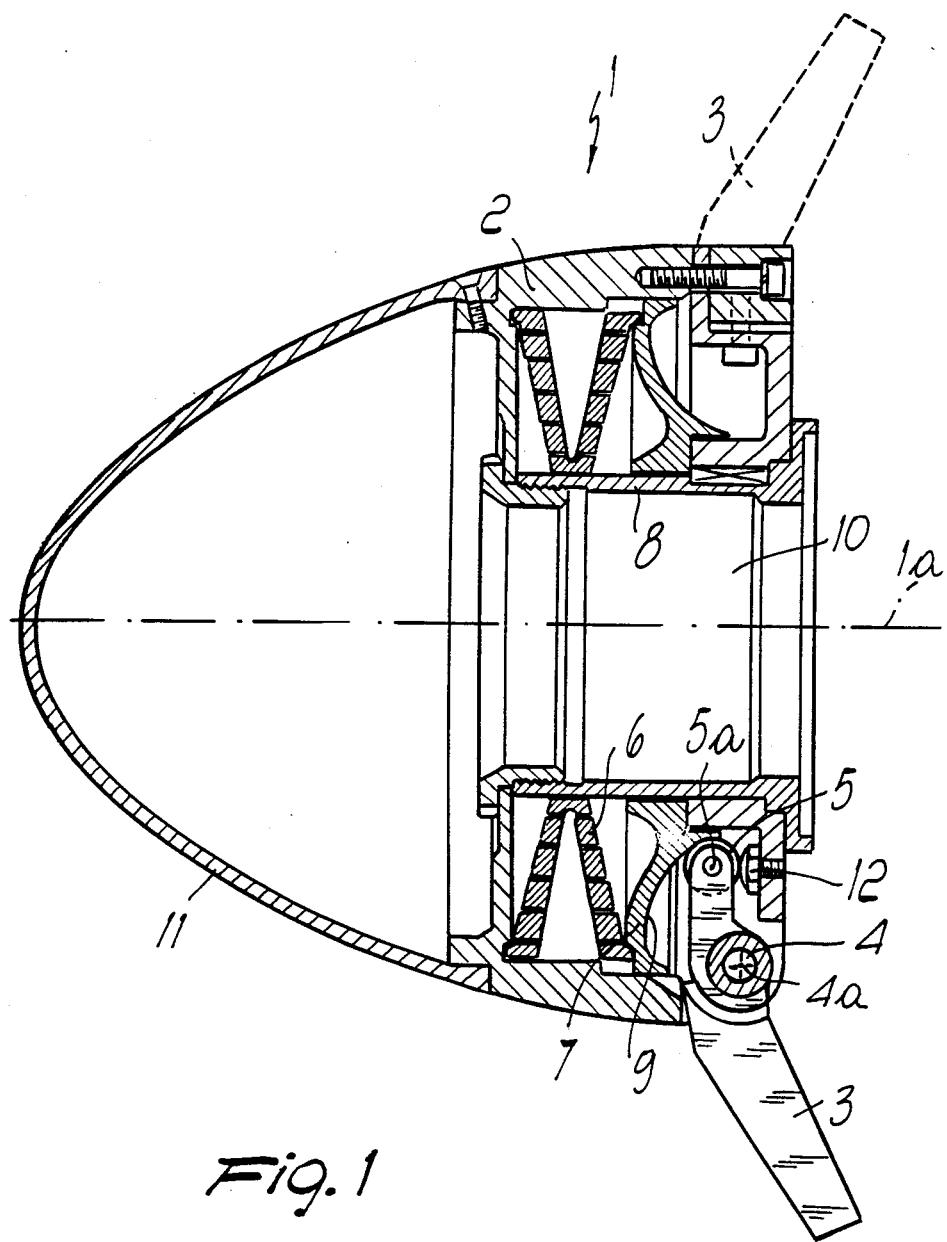
FIG. 1 is a sectional view of the turbine according to the invention, taken along a diametrical plane in an operating condition.

With reference to the above figures, the turbine according to the invention, generally indicated by the reference numeral 1, comprises a central body 2 which is rotatably supported about the axis 1a of the turbine and is intended to be connected in a per se known manner to the shaft of a user device, such as for example an alternator or a pump of a hydraulic circuit. The central body 2 supports at least two vanes 3, six vanes in the instant case, which are rigidly associated with the central body 2 in their rotation about the axis 1a of the turbine and are movable, according to the invention, relatively to the central body 2 to vary the front area of the turbine affected by the rotation of the vanes.

More particularly, each vane 3 is oscillably connected to the central body 2 by means of a pivot 4 which has an axis 4a arranged perpendicularly to an ideal radial plane which passes through the axis 1a of the turbine and through the longitudinal axis of the same vane 3 (the sheet plane, in the case of the vanes visible in FIG. 1).

Each vane 3 is conveniently associated with the respective pivot 4 at an intermediate portion of its length and, at its end directed towards the axis 1a of the turbine, it has a mass 5 which is movable by centrifugal action in a direction having a radial component with respect to the axis 1a so as to oscillate the vane about the axis 4a.

More particularly, the mass 5 is defined by a wheel which is rotatably supported by the respective vane about an axis 5a which is parallel to the axis 4a of the pivot 4. Elastic means 6 act on the vane 3 in contrast with the action of the wheel 5 during the rotation of the vanes, wherein advantageously between said elastic means 6 and the wheel 5 an adjustment element 7 is interposed.

The elastic means 6 are conveniently defined by an annular spring with a V-shaped radial cross section, which is arranged inside and coaxially to the central body 2 and can be compressed in an axial direction.

The adjustment element 7 comprises an annular cam which is also arranged inside the central body 2 and coaxially thereto and contacts the spring 6 on one side and the wheel 5 on the other side. The cam 7 and the spring 6 are mounted on a hollow shaft 8 which is a part of the central body 2 and are slidable in a direction which is parallel to the axis 1a.

The side of the cam 7 directed towards the wheel 5 has a profile 9 which is followed by the wheel 5 when said wheel, by centrifugal action, follows an arc-like path centered on the oscillation axis 4a of the respective vane. Said profile 9 is shaped so as to adjust the force exerted by the spring 6 on the vane 3 as a function of the position occupied by the wheel 5 along its arc-like path to meet the adjustment requirements of the turbine rotation rate.

The path of the wheel 5 is conveniently delimited by stop means constituted, in the illustrated case, by a screw 12 and by the final portion of the profile of the cam 7.

The central body 2 advantageously comprises, as mentioned, a hollow shaft 8 which defines, at the center of the turbine, a passage 10 which can be effectively used for the passage of a waveguide for electronic PODs. Therefore, the front side 11 of the central body, which is ogival in a known manner, may be made of an also known material which is permeable to electromagnetic waves.

The operation of the turbine according to the invention is as follows.

In the absence of a relative motion between the turbine and the fluid in which it is immersed, the position of the vanes 3 is the one illustrated in FIG. 1, i.e. the vanes are in their position of maximum radial excursion with respect to the central body 2. As the relative speed of the fluid increases, with an equal load applied to the user device, the mass 5, by centrifugal action, gradually moves radially outwards, following the profile 9 and axially pushing the cam 7 in contrast with the action of the spring 6. The movement of the mass 5 causes oscillation of the respective vane 3 about the axis 4a with a consequent reduction of the front area of the turbine affected by the rotation of the vanes. The reduction of the passage area of the fluid which acts on the vanes tends to reduce the turbine rotation rate. Therefore, a balance is established which stabilizes the rotation rate within the turbine correct operating range. A variation in the relative speed of the fluid or a variation in the load of the user alters lo this balance, causing a simultaneous oscillation of all the vanes about the respective axis 4a, with a consequent variation of the front area of the turbine affected by the vanes; in this manner the rotation rate of the turbine remains within a preset range as the speed of the motive fluid relatively to the turbine and as the load of the user vary.

The variation range of the turbine rotation rate can be preset at the design stage since it depends on the value of the eccentric masses 5, the profile 9 of the cam 7 and the elastic rigidity of the spring 6.

In practice it has been observed that the turbine according to the invention fully achieves the intended aim and the proposed objects, since excellent energy efficiencies are achieved for a broad range of relative speeds of the motive fluid by varying the front area of the turbine affected by the rotation of the vanes. The reduction of the front area affected by the vanes at high relative speeds of the motive fluid furthermore reduces aerodynamic resistances and stresses on the fixing structures.

Another advantage of the turbine according to the invention is that it is possible to use a greater number of vanes and therefore reduce their maximum dimensions, allowing the use of a larger ogival central body with respect to known turbines, allowing to easily provide an axial passage for a waveguide for electronic PODs.

Though the turbine according to the invention has been conceived in particular for the exploitation of wind power for auxiliary power sources in aeronautical applications, it may be successfully adopted even for other uses; thus, for example, turbines according to the invention may be mounted on the tips of the blades of auto-rotating windmills and used as speed multipliers to produce electric power.

The turbine thus conceived is susceptible to numerous modifications and variations, all of which are within the scope of the inventive concept; all the details may furthermore be replaced with technically equivalent elements.

In practice the materials employed, so long as compatible with the specific use, as well as the dimensions, may be any according to the requirements and to the state of the art.

What is claimed:

1. A high-efficiency turbine comprising a central body, at least two vanes, centrifugal mass means, and elastic contrasting means, said at least two vanes protruding externally from and being pivotally associated with said central body thereby allowing for different positioning of said at least two vanes relative to said central body, a rotation axis being defined by said central body, said central body and said at least two vanes rotating about said rotation axis at a rotation speed, said centrifugal mass means and said elastic contrasting means being associated with said at least two vanes and rotating along with said central body around said rotation axis, said centrifugal mass means and said elastic contrasting means simultaneously supplying opposite moments to said at least two vanes thereby positioning said at least two vanes relative to said central body so as to keep constant said rotation speed, said turbine further comprising an adjustment element, said adjustment element being constituted by at least one cam element defining on one side thereof a cam profile, said centrifugal mass means comprising a follower for each one of said at least two vanes, said at least one cam element being interposed between said elastic contrasting means and said centrifugal mass means such that said cam profile communicates motion to said follower of said centrifugal mass means, said elastic contrasting means being associated with said at least one cam element opposite to said cam profile.

2. A turbine according to claim 1, each said at least two vanes being rotatably pivoted to said central body about an oscillation axis, said oscillation axis being substantially perpendicular to a radial plane which passes through said rotation axis and a longitudinal axis of one of said at least two vanes being rotatably pivoted thereto, said centrifugal mass means further comprising a moment arm for each one of said at least two vanes, each said follower being constituted by a weighted mass wheel and being rotatably connected to one said moment arm at one end thereof, each said moment arm at another end thereof being connected to one of said at least two vanes at one said oscillation axis thereof, said weighted mass wheel following an arc-shaped path about said oscillation axis due to centrifugal force generated during rotation of said central body about said rotation axis thereby oscillating one of said at least two vanes about said oscillation axis, said cam path being shaped so as to adjust moments provided by said elastic contrasting means and said centrifugal mass means to meet adjustment requirements of said rotation speed of said central body about said rotation axis.

3. A turbine according to claim 2, said elastic contrasting means comprising an annular spring, said annular spring extending inside said central body about said rotation axis and having a substantially V-shaped radial cross-section, said at least one cam element being a single annular cam element and being arranged about said rotation axis.

4. A turbine according to claim 1, wherein said central body defines an axial passage, said axial passage thereby allowing entrance of waveguides for electronic PODs.

5. A high-efficiency turbine driven by a freestream fluid flow comprising a central body defining a rotation axis, said rotation axis being substantially parallel to direction of freestream fluid flow, a plurality of blade means being pivotally associated with said central body and being movalbe together between an extended position and a retracted position, thereby presenting a variable exposure area normal to freestream fluid flow, elastic contrasting means for urging said plurality of blade means towards said extended position, centrifugal mass means for urging said plurality of blade means towards said retracted position, adjustment means comprising at least one cam element, said at least one cam element defining on one side thereof a cam profile, said cam profile communicating motion with said centrifugal mass means, said elastic contrasting means being associated with said at least one cam element at a side opposite to said cam profile.

6. A turbine according to claim 5, said plurality of blade means comprising at least two vanes, each said at least two vanes being rotatably pivoted to said central body about an oscillation axis, said oscillation axis being substantially perpendicular to a radial plane which passes through said rotation axis and a longitudinal axis of one of said at least two vanes being rotatably pivoted thereto, said centrifugal mass means further comprising, for each one of said at least two vanes, a moment arm and a follower, each said follower being constituted by a weighted mass wheel and being rotatably connected to one said moment arm at one end thereof, each said moment arm at another end thereof being connected to one of said at least two vanes at one said oscillation axis thereof, said weighted mass wheel following an arc-shaped path about said oscillation axis due to centrifugal force generated during rotation of said central body about said rotation axis thereby oscillating one of said at least two vanes about said oscillation axis, said cam path being shaped so as to adjust moments provided by said elastic contrasting means and said centrifugal mass means to meet adjustment requirements of said rotation speed of said central body about said rotation axis.

7. A turbine according to claim 6, said elastic contrasting means comprising an annular spring, said annular spring extending inside said central body about said rotation axis and having a substantially V-shaped radial cross-section, said at least one cam element being a single annular cam element being arranged about said rotation axis.

8. A turbine according to claim 5, wherein said central body defines an axial passage, said axial passage thereby allowing entrance of waveguides for electronic PODs.

9. A high-efficiency turbine driven by freestream fluid flow, said turbine comprising a central body, at least two vanes, inertia governor means, and elastic contrasting means, said at least two vanes being pivotally associated with said central body, said at least two vanes being movable together between an extended position and a retracted position, said at least two vanes thereby presenting a variable exposure area normal to freestream fluid flow, a rotation axis being defined by said central body, said central body and said at least two vanes rotating about said rotation axis, a rotation speed of said central body being thereby defined, aid elastic contrasting means being associated with said at least two vanes and with said central body and urging said at least two vanes together into said extended position, said inertia governor means being associated with said at least two vanes and with said central body and urging said at least two vanes together into said contracted position, said turbine further comprising adjustment means, said adjustment means comprising at least one cam element defining on one side thereof a cam profile, said inertia governor means comprising a follower for each one of said at least two vanes, said at least one cam element being interposed between said elastic contrasting means and said inertia governor means such that said cam profile communicates motion to said follower of said inertia governor means, said elastic contrasting means being associated with said at least one cam element opposite to said cam profile.

10. A turbine according to claim 9, each said at least two vanes being rotatably pivoted to said control body about an oscillation axis, said oscillation axis being substantially perpendicular to a radial plane which passes through said rotation axis and a longitudinal axis of one of said at least two vanes being rotatably pivoted thereto, said inertia governor means further comprising a moment arm for each one of said at least two vanes, each said follower being constituted by a weighted mass wheel and being rotatably connected to one said moment arm at one end thereof, each said moment arm at another end thereof being connected to one of said at least two vanes at one said oscillation axis thereof, said weighted mass wheel following an arch-shaped path about said oscillation axis due to centrifugal force generated during rotation of said central body about said rotation axis thereby oscillating one of said at least two vanes about said oscillation axis, said cam path being shaped so as to adjust moments provided by said elastic contrasting means and said inertia governor means to meet adjustment requirements of said rotation speed of said central body about said rotation axis.

11. A turbine according to claim 10, said elastic contrasting means comprising an annular spring, said annular spring extending inside said central body about said rotation axis and having a substantially V-shaped radial cross-section, said at least one cam element being a single annular cam element and being arranged about said rotation axis.

12. A turbine according to claim 9, wherein said central body defines an axial passage, said axial passage thereby allowing entrance of waveguides for electronic PODs.

* * * * *